(12) United States Patent
Tu et al.

(10) Patent No.: US 8,996,902 B2
(45) Date of Patent: Mar. 31, 2015

(54) MODAL WORKLOAD SCHEDULING IN A HETEROGENEOUS MULTI-PROCESSOR SYSTEM ON A CHIP

(71) Applicant: QUALCOMM Incorporated, San Diego, CA (US)

(72) Inventors: Alex K. Tu, San Diego, CA (US); Thomas A. Morison, San Diego, CA (US); Hee-Jun Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 13/658,229

(22) Filed: Oct. 23, 2012

(65) Prior Publication Data

US 2014/0115363 A1    Apr. 24, 2014

(51) Int. Cl.
*G06F 1/00* (2006.01)
*G06F 1/20* (2006.01)
*G06F 1/32* (2006.01)

(52) U.S. Cl.
CPC ............... *G06F 1/206* (2013.01); *G06F 1/329* (2013.01); *G06F 1/3293* (2013.01); *Y02B 60/121* (2013.01); *Y02B 60/144* (2013.01); *Y02B 60/1275* (2013.01)
USPC ........................................................ 713/323

(58) Field of Classification Search
CPC .... G06F 1/3203; G06F 1/3206; G06F 1/3243
USPC ........................... 713/300, 310, 320, 330, 340
See application file for complete search history.

(56) References Cited

U.S. PATENT DOCUMENTS

| | | | |
|---|---|---|---|
| 4,071,740 | A | 1/1978 | Gogulski |
| 4,471,218 | A | 9/1984 | Culp |
| 5,450,003 | A | 9/1995 | Cheon |
| 5,596,735 | A | 1/1997 | Hervin et al. |
| 6,631,474 | B1 | 10/2003 | Cai et al. |

(Continued)

FOREIGN PATENT DOCUMENTS

| | | |
|---|---|---|
| EP | 1555595 A2 | 7/2005 |
| WO | 2012058786 A1 | 5/2012 |

OTHER PUBLICATIONS

International Search Report and Written Opinion—PCT/US2013/061334—ISA/EPO—Apr. 11, 2014.

(Continued)

*Primary Examiner* — Kim Huynh
*Assistant Examiner* — Paul J Yen
(74) *Attorney, Agent, or Firm* — Nicholas A. Cole

(57) ABSTRACT

Various embodiments of methods and systems for mode-based reallocation of workloads in a portable computing device ("PCD") that contains a heterogeneous, multi-processor system on a chip ("SoC") are disclosed. Because individual processing components in a heterogeneous, multi-processor SoC may exhibit different performance capabilities or strengths, and because more than one of the processing components may be capable of processing a given block of code, mode-based reallocation systems and methodologies can be leveraged to optimize quality of service ("QoS") by allocating workloads in real time, or near real time, to the processing components most capable of processing the block of code in a manner that meets the performance goals of an operational mode. Operational modes may be determined by the recognition of one or more mode-decision conditions in the PCD.

40 Claims, 8 Drawing Sheets

(56) References Cited

U.S. PATENT DOCUMENTS

| | | |
|---|---|---|
| 6,681,336 B1 | 1/2004 | Nakazato et al. |
| 7,596,709 B2 | 9/2009 | Cooper et al. |
| 2001/0001878 A1 | 5/2001 | Isaac et al. |
| 2001/0035455 A1 | 11/2001 | Davis et al. |
| 2002/0122298 A1 | 9/2002 | Cohen et al. |
| 2002/0133241 A1 | 9/2002 | Takahashi et al. |
| 2003/0043096 A1 | 3/2003 | Heie |
| 2003/0110423 A1 | 6/2003 | Helms et al. |
| 2003/0115013 A1 | 6/2003 | Dendinger |
| 2003/0117759 A1 | 6/2003 | Cooper |
| 2003/0237012 A1 | 12/2003 | Jahagirdar et al. |
| 2004/0078606 A1 | 4/2004 | Chen et al. |
| 2004/0111649 A1 | 6/2004 | Lin et al. |
| 2004/0215987 A1 | 10/2004 | Farkas et al. |
| 2005/0008069 A1 | 1/2005 | Cao |
| 2005/0044429 A1 | 2/2005 | Gaskins et al. |
| 2005/0050373 A1 | 3/2005 | Orenstien et al. |
| 2005/0285571 A1 | 12/2005 | Grunert et al. |
| 2005/0289365 A1 | 12/2005 | Bhandarkar |
| 2006/0085653 A1 | 4/2006 | Bollinger et al. |
| 2007/0016815 A1* | 1/2007 | Cooper et al. ............... 713/322 |
| 2007/0118773 A1 | 5/2007 | Tsuji |
| 2007/0156370 A1 | 7/2007 | White et al. |
| 2007/0250219 A1 | 10/2007 | Gaskins et al. |
| 2008/0126748 A1 | 5/2008 | Capps et al. |
| 2008/0143423 A1 | 6/2008 | Komatsu et al. |
| 2008/0148015 A1 | 6/2008 | Takamoto et al. |
| 2008/0163255 A1 | 7/2008 | Munoz et al. |
| 2008/0263324 A1 | 10/2008 | Sutardja et al. |
| 2009/0094438 A1 | 4/2009 | Chakraborty et al. |
| 2009/0094481 A1 | 4/2009 | Vera et al. |
| 2009/0150893 A1 | 6/2009 | Johnson et al. |
| 2009/0172423 A1 | 7/2009 | Song et al. |
| 2009/0177445 A1 | 7/2009 | Capps, Jr. et al. |
| 2009/0240979 A1 | 9/2009 | Campini et al. |
| 2009/0287909 A1 | 11/2009 | Vera et al. |
| 2009/0288092 A1 | 11/2009 | Yamaoka |
| 2009/0309243 A1 | 12/2009 | Carmack et al. |
| 2009/0327680 A1 | 12/2009 | Dale et al. |
| 2010/0153700 A1 | 6/2010 | Capps, Jr. et al. |
| 2010/0153954 A1 | 6/2010 | Morrow et al. |
| 2011/0138387 A1 | 6/2011 | Ahn et al. |
| 2011/0173432 A1 | 7/2011 | Cher et al. |
| 2011/0213950 A1 | 9/2011 | Mathieson et al. |
| 2011/0213998 A1 | 9/2011 | Mathieson et al. |
| 2011/0265090 A1 | 10/2011 | Moyer et al. |
| 2012/0117403 A1 | 5/2012 | Bieswanger et al. |
| 2012/0173895 A1* | 7/2012 | Kim et al. .................... 713/300 |
| 2012/0233477 A1* | 9/2012 | Wu et al. ...................... 713/320 |
| 2013/0047166 A1 | 2/2013 | Penzes et al. |
| 2013/0086395 A1 | 4/2013 | Liu |

OTHER PUBLICATIONS

Nowroz A.N. et al., "Thermal monitoring of real processors: Techniques for sensor allocation and full Characterization", Design Automation Conference (DAC), 2010 47th ACM/IEEE. Publication Date: Jun. 13-18, 2010, pp. 56-61. ISSN: 0738-100X.

Huang L., et al., "Characterizing the Lifetime Reliability of Manycore Processors with Core-Redundancy", Computer-Aided Design (ICCAD), IEEE/ACM International Conference on IEEE, Piscataway, NJ, USA, Nov. 7, 2010, pp. 680-685, XP031815367.

* cited by examiner

FIG. 2

| Operational Mode | Exemplary Mode-decision conditions or triggers |
|---|---|
| Switch to High Performance Processing ("HPP") Mode | Performance benchmark detected |
| | Battery charger connected |
| | User setting |
| | Any core > 90% utilization |
| | User Interface response time > 100 msec |
| | Docking station recognized |
| | Gaming use case |
| Switch to Power Saving ("PS") Mode | < 10% battery capacity remaining |
| | User setting |
| | Active thermal mitigation ongoing |
| | High on-chip temperature |
| | Wake-ups during standby |
| | Operating System background tasks running |
| | Process frequency demand < lowest max frequency of cores |
| | All cores < 50% utilization |

MODAL WORKLOAD SCHEDULING IN A HETEROGENEOUS MULTI-PROCESSOR SYSTEM ON A CHIP

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Consequently, thermal energy generation is often managed in a PCD through the application of various thermal management techniques that may include wilting or shutting down electronics at the expense of processing performance. Thermal management techniques are employed within a PCD in an effort to seek a balance between mitigating thermal energy generation and impacting the quality of service ("QoS") provided by the PCD. When excessive thermal energy generation is not a concern, however, the QoS may be maximized by running processing components within the PCD at a maximum frequency rating.

In a PCD that has heterogeneous processing components, the various processing components are not created equal. As such, when thermal energy generation is not a concern in a heterogeneous processor, running all the processing components at a maximum frequency rating that is dictated by the slowest processing component may underutilize the actual processing capacity available in the PCD. Similarly, when conditions in a heterogeneous PCD dictate that power savings are preferable to processing speeds (such as when thermal energy generation is a concern, for example), the assumption that all the processing components are functionally equivalent at a given reduced processing speed may result in workload allocations that consume more power than necessary.

Accordingly, what is needed in the art is a method and system for allocating workload in a PCD across heterogeneous processing components to meet performance goals associated with operational modes of the PCD, taking into account known performance characteristics of the individual processing components.

SUMMARY OF THE DISCLOSURE

Various embodiments of methods and systems for mode-based workload reallocation in a portable computing device that contains a heterogeneous, multi-processor system on a chip ("SoC") are disclosed. Because individual processing components in a heterogeneous, multi-processor SoC may exhibit different performance capabilities or strengths, and because more than one of the processing components may be capable of processing a given block of code, mode-based reallocation systems and methodologies can be leveraged to optimize quality of service ("QoS") by allocating workloads in real time, or near real time, to the processing components most capable of processing the block of code in a manner that meets the performance goals of an operational mode.

One such method involves determining the performance capabilities of each of a plurality of individual processing components in the heterogeneous, multi-processor SoC. The performance capabilities may include the maximum processing frequency and the quiescent supply current exhibited by each processing component. Notably, as one of ordinary skill in the art would recognize, those processing components with the relatively higher maximum processing frequencies may be best suited for processing workloads when the PCD is in a high performance processing ("HPP") mode while those processing components exhibiting the relatively lower quiescent supply currents may be best suited for processing workloads when the PCD is in a power saving ("PS") mode.

Indicators of one or more mode-decision conditions in the PCD are monitored. Based on the recognized presence of any one or more of the mode-decision conditions, an operational mode associated with certain performance goals of the PCD is determined. For instance, an indication that a battery charger has been plugged into the PCD, thereby providing an essentially unlimited power source, may trigger a HPP operational mode having an associated performance goal of processing workloads at the fastest speed possible. Similarly, an indication that a battery capacity has fallen below a predetermined threshold, thereby creating a risk that the PCD may lose its power source, may trigger a PS operational mode having an associated performance goal of processing workloads with the least amount of power expenditure.

Based on the operational mode and its associated performance goal(s), an active workload of the processing components may be reallocated across the processing components based on the individual performance capabilities of each. In this way, those processing components that are best positioned to process the workload in a manner that satisfies the performance goals of the operational mode are prioritized for allocation of the workload.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 2 is a chart illustrating exemplary conditions or triggers that may dictate an operational mode of a PCD.

DETAILED DESCRIPTION

Figure 1:
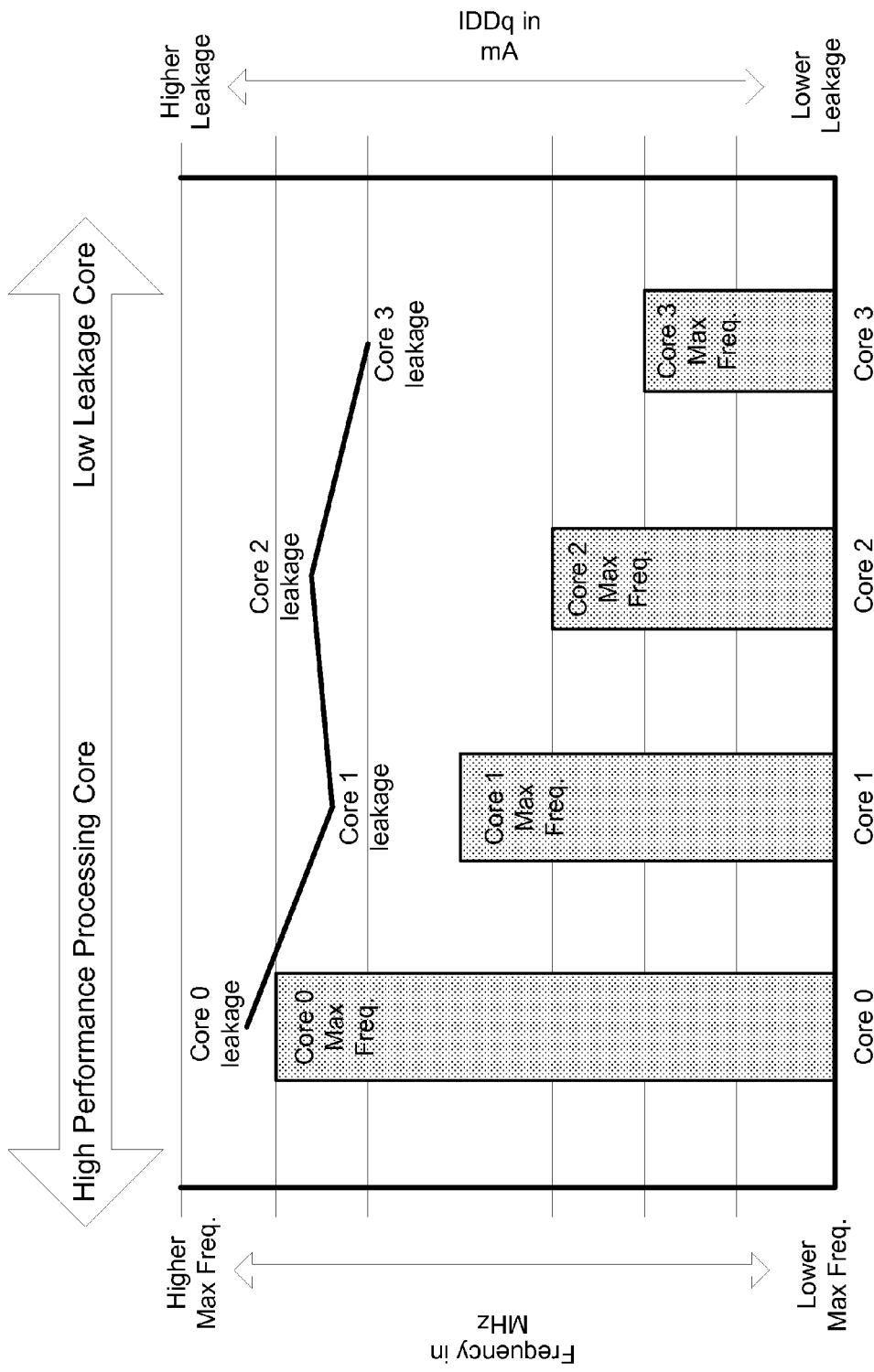
FIG. 1 is a graph illustrating the processing capacities and leakage rates associated with exemplary cores 0, 1, 2 and 3 in a given quad core chipset of a portable computing device ("PCD").

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "processing engine," "application processor" and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "chip" and "chipset" are non-limiting examples of processing components that may reside in a PCD and are used interchangeably except when otherwise indicated. Moreover, as distinguished in this description, a CPU, DSP, or a chip or chipset may be comprised of one or more distinct processing components generally referred to herein as "core(s)" and "sub-core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload" and "block of code" are used interchangeably and generally directed toward the processing burden, or percentage of processing burden, that is associated with, or may be assigned to, a given processing component in a given embodiment. Further to that which is defined above, a "processing component" may be, but is not limited to, a central processing unit, a graphical processing unit, a core, a main core, a sub-core, a processing area, a hardware engine, etc. or any component residing within, or external to, an integrated circuit within a portable computing device. Moreover, to the extent that the terms "thermal load," "thermal distribution," "thermal signature," "thermal processing load" and the like are indicative of workload burdens that may be running on a processing component, one of ordinary skill in the art will acknowledge that use of these "thermal" terms in the present disclosure may be related to process load distributions, workload burdens and power consumption.

In this description, the terms "thermal mitigation technique (s)," "thermal policies," "thermal management" and "thermal mitigation measure(s)" are used interchangeably.

One of ordinary skill in the art will recognize that the term "DMIPS" represents the number of Dhrystone iterations required to process a given number of millions of instructions per second. In this description, the term is used as a general unit of measure to indicate relative levels of processor performance in the exemplary embodiments and will not be construed to suggest that any given embodiment falling within the scope of this disclosure must, or must not, include a processor having any specific Dhrystone rating.

In this description, the terms "allocation" and "reallocation" are generally used interchangeably. Use of the term "allocation" is not limited to an initial allocation and, as such, inherently includes a reallocation.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the term "performance" is generally used to reference the efficiency of one processing component compared to another and, as such, may be quantified in various units depending on the context of its use. For example, a high capacity core may exhibit better performance than a low capacity core when the context is the speed in MHz at which the cores can process a given workload. Similarly, a low capacity core may exhibit better performance than a high capacity core when the context is the quiescent supply currents ("IDDq"), i.e. the power consumption in mA, associated with the cores when processing a given workload.

Managing processing performance for QoS optimization in a PCD that has a heterogeneous processing component(s) can be accomplished by leveraging the diverse performance characteristics of the individual processing engines that are available for workload allocation. With regards to the diverse performance characteristics of various processing engines that may be included in a heterogeneous processing component, one of ordinary skill in the art will recognize that performance differences may be attributable to any number of reasons including, but not limited to, differing levels of silicon, design variations, etc. Moreover, one of ordinary skill in the art will recognize that the performance characteristics associated with any given processing component may vary in relation with the operating temperature of that processing component, the power supplied to that processing component, etc.

For instance, consider an exemplary heterogeneous multi-core processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low capacity to medium capacity processing core within the heterogeneous processor will exhibit a lower power leakage rate at a given workload capacity, and consequently a lower rate of thermal energy generation, than a processing core having a relatively high performance capacity. The higher capacity core may be capable of processing a given number of DMIPs in a shorter amount of time than a lower capacity core. For these reasons, one of ordinary skill in the art will recognize that a high capacity core may be more desirable for a workload allocation when the PCD is in a "high performance" mode whereas a low capacity core, with its lower current leakage rating, may be more desirable for a workload allocation when the PCD is in a "power saving" mode.

Recognizing that certain cores in a heterogeneous processor are better suited to process a given workload than other cores when the PCD is in certain modes of operation, a mode-based workload reallocation algorithm can be leveraged to reallocate workloads to the processing core or cores which offer the best performance in the context of the given mode. For example, certain conditions in a PCD may dictate that the PCD is in a high performance mode where performance is measured in units of processing speed. Consequently, by recognizing that the PCD is in a high performance mode, a mode-based workload reallocation algorithm may dictate that workloads be processed by those certain cores in the heterogeneous processor that exhibit the highest processing speeds. Conversely, if conditions within the PCD dictate that the PCD is in a power saving mode where performance is measured in units associated with current leakage, a mode-based workload reallocation algorithm may dictate that workloads be processed by those certain cores in the heterogeneous processor that exhibit the lowest IDDq rating.

As a non-limiting example, a particular block of code may be processed by either of a central processing unit ("CPU") or a graphical processing unit ("GPU") within an exemplary PCD. Advantageously, instead of predetermining that the particular block of code will be processed by one of the CPU or GPU, an exemplary embodiment may select which of the processing components will be assigned the task of processing the block of code based on the recognition of conditions within the PCD associated with a given mode. That is, based on the operational mode of the PCD, the processor best equipped to efficiently process the block of code is assigned the workload. Notably, it will be understood that subsequent processor selections for reallocation of subsequent workloads may be made in real time, or near real time, as the operational mode of the PCD changes. In this way, a modal allocation manager ("MAM") module may leverage performance characteristics associated with individual cores in a heterogeneous processor to optimize QoS by selecting processing cores based on the performance priorities associated with operational modes of the PCD.

FIG. 1 is a graph illustrating the processing capacities and leakage rates associated with exemplary cores 0, 1, 2 and 3 in a given quad core chipset of a PCD. Notably, although certain features and aspects of the various embodiments are described herein relative to a quad core chipset, one of ordinary skill in the art will recognize that embodiments may be applied in any multi-core chip. In the exemplary illustration, Core 0 represents the core having the highest processing capacity (Core 0 max freq.) and, as such, would be the most desirable core for workload allocation when the PCD is in a "high performance" mode. Conversely, core 3 represents the core having the lowest current leakage rating (Core 3 leakage) and, as such, would be the most desirable core for workload allocation when the PCD is in a "power saving" mode. The cores may reside within any processing engine capable of processing a given block of code including, but not limited to, a CPU, GPU, DSP, programmable array, etc.

As can be seen from the FIG. 1 illustration, each of the cores exhibits unique performance characteristics in terms of processing speeds and power consumption. Core 0 is capable of processing workloads at a relatively high processing speed (Core 0 max freq.), yet it also has a relatively high IDDq (Core 0 leakage). Core 1 is capable of processing workloads at a speed higher than cores 2 and 3 but is not nearly as fast as Core 0. Thus, Core 1 is the second most efficient of the cores in terms of processing speed. The IDDq rating of Core 1 (Core 1 leakage) also makes it the second most efficient of the cores in terms of leakage rate. Core 2 exhibits a relatively slow processing speed (Core 2 max freq.) and a relatively high IDDq rating (exceeded only by that of Core 1) And, Core 3 exhibits the slowest processing speed of the cores, but advantageously also consumes the least amount of power of all the cores (Core 3 leakage).

Advantageously, the core-to-core variations in maximum processing frequencies and quiescent leakage rates can be leveraged by a MAM module to select processing components best positioned to efficiently process a given block of code when the PCD is in a given operational mode. For example, when the PCD is in a power saving mode, a MAM module may allocate or reallocate workloads first to Core 3, then to Core 1, then to Core 2 and finally to Core 0 so that current leakage is minimized. Similarly, when the PCD is in a high performance mode, a MAM module may allocate or reallocate workloads first to Core 0, then to Core 1, then to Core 2 and finally to Core 3 as needed in order to maximize the speed at which the workloads are processed.

One of ordinary skill in the art will recognize that the various scenarios for workload scheduling outlined above do not represent an exhaustive number of scenarios in which a comparative analysis of performance characteristics may be beneficial for workload allocation in a heterogeneous multi-core processor and/or a heterogeneous multi-processor SoC. As such, it will be understood that any workload allocation component or module that is operable to compare the performance characteristics of two or more processing cores in a heterogeneous multi-core processor or heterogeneous multi-processor SoC, as the case may be, to determine a workload allocation or reallocation is envisioned. A comparative analysis of processing component performance characteristics according to various embodiments can be used to allocate workloads among a plurality of processing components based on the identification of the most efficient processing component available based on the operational mode.

FIG. 2 is a chart illustrating exemplary conditions or triggers that may dictate an operational mode of a PCD. Based on recognition of one or more of the triggers, a MAM module may determine the operational mode and subsequently allocate or reallocate workloads to processing cores based on the performance goals associated with the given operational mode.

For example, connection of a battery charger to the PCD may trigger a MAM module to designate the operational mode as a high performance processing ("HPP") mode. Accordingly, workloads may be allocated to those one or more processing components having the highest processing frequencies, such as core 0 of FIG. 1. As another example, recognition that battery capacity is low in the PCD may cause the MAM module to designate the operational mode as a power saving ("PS") mode. Consequently, because the performance goals associated with a power saving mode includes conserving power, workloads may be reallocated away from high frequency cores to lower frequency cores that exhibit more efficient power consumption characteristics, such as core 3 of FIG. 1.

Notably, it is envisioned that some embodiments of a MAM module may recognize the presence of multiple mode-decision conditions. To the extent that the recognized conditions point to different operational modes, certain embodiments may prioritize or otherwise reconcile the conditions in order to determine the best operational mode. For example, suppose that a user of a PCD preset the mode to an HPP mode and also plugged in the battery charger, but at the same time a thermal policy manager ("TPM") module is actively engaged in application of thermal mitigation measures. In such a scenario, a MAM module may prioritize the ongoing thermal mitigation over the user setting and charger availability, thereby determining that the operational mode should be a PS mode.

Other exemplary mode-decision conditions illustrated in FIG. 2 as possible triggers for a HPP mode include detection of a performance benchmark, a core utilization greater than some threshold (e.g., >90%), a user interface response time greater than some threshold (e.g., >100 msec), recognition of a docked state, and a use case with a high processing speed demand (e.g., a gaming use case). Notably, the HPP mode-decision conditions outlined in the FIG. 2 graph are not offered as an exhaustive list of the triggers that may be used to point a MAM module to a HPP mode and, as such, one of ordinary skill in the art will recognize that other triggers or conditions within a PCD may be used to indicate that workloads should be allocated or reallocated to processing components with high frequency processing capabilities. Moreover, one of ordinary skill in the art will recognize that HPP mode-decision conditions may be associated with scenarios that require more processing capacity in order to optimize QoS and/or scenarios where power availability is abundant.

Other exemplary mode-decision conditions illustrated in FIG. 2 as possible triggers for a PS mode include recognition of a battery capacity below a certain threshold (e.g., <10% remaining), a user setting to a PS mode, application of one or more thermal mitigation techniques, detection of a relatively high on-chip temperature reading, low processing capacity use case (e.g., wake-up from standby mode, OS background tasks, workload requires less than the maximum frequency associated with the slowest processing component, all cores are running at a relatively low frequency to process the active workload, etc.). Notably, the PS mode-decision conditions outlined in the FIG. 2 graph are not offered as an exhaustive list of the triggers that may be used to point a MAM module to a PS mode and, as such, one of ordinary skill in the art will recognize that other triggers or conditions within a PCD may be used to indicate that workloads should be allocated or reallocated to processing components with low power consumption characteristics. Moreover, one of ordinary skill in the art will recognize that PS mode-decision conditions may be associated with scenarios that do not require high processing capacity in order to optimize QoS and/or scenarios where power availability is limited.

Figure 3:
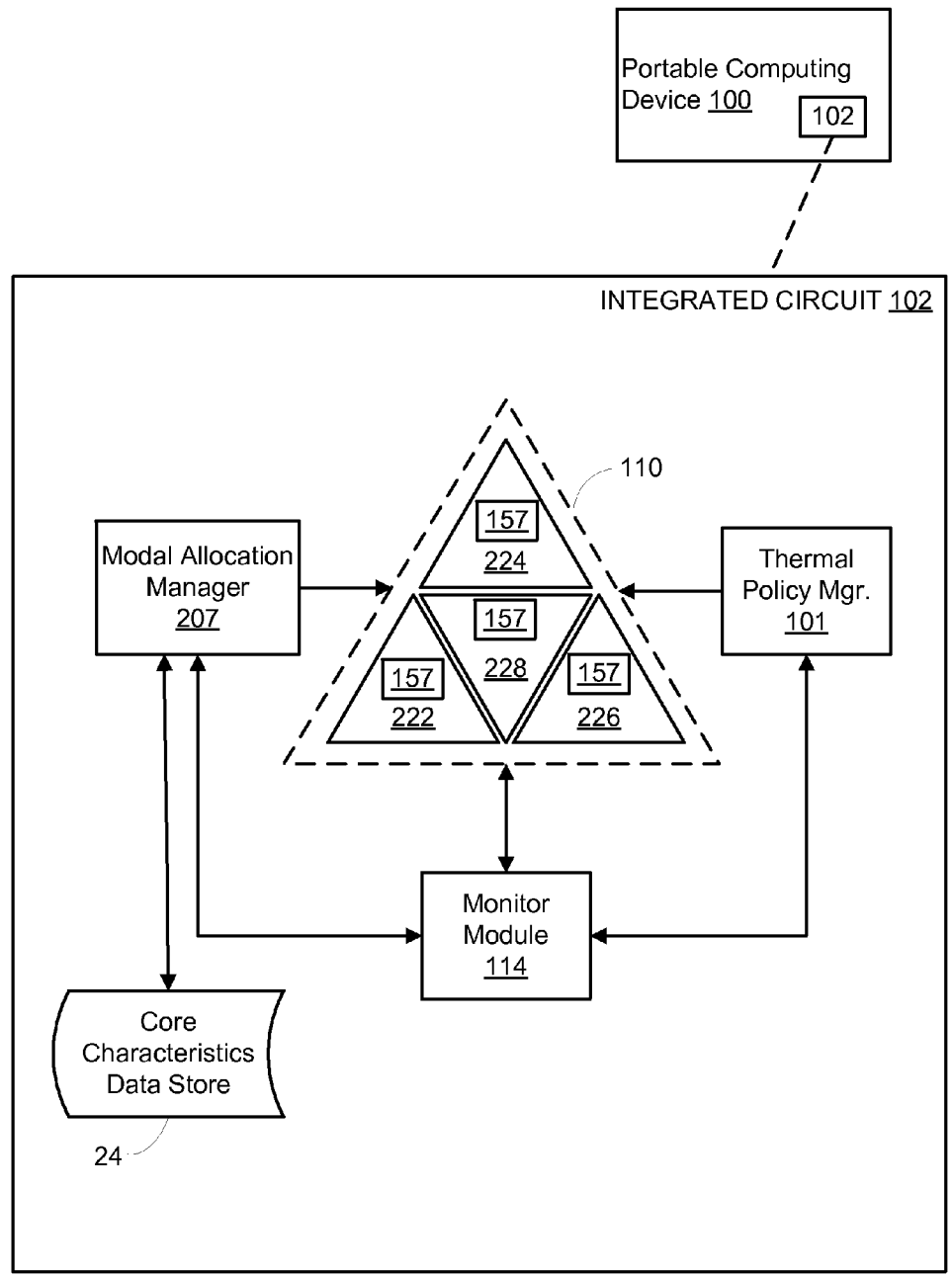
FIG. 3 is a functional block diagram illustrating an embodiment of an on-chip system for mode-based workload reallocation in a heterogeneous, multi-core PCD.

FIG. 3 is a functional block diagram illustrating an embodiment of an on-chip system 102 for mode-based workload reallocation in a heterogeneous, multi-core PCD 100. As explained above relative to the FIGS. 1 and 2 illustrations, the workload reallocation across the processing components 222, 224, 226, 228 may be based on determination of an operational mode. Depending on the performance goals of a given operational mode, a modal allocation manager ("MAM") module 207 may cause workloads to be reallocated among the various processing components 222, 224, 226, 228 such that the performance goals associated with a given operational mode are achieved. Notably, as one of ordinary skill in the art will recognize, the processing component(s) 110 is depicted as a group of heterogeneous processing engines 222, 224, 226, 228 for illustrative purposes only and may represent a single processing component having multiple, heterogeneous cores 222, 224, 226, 228 or multiple, heterogeneous processors 222, 224, 226, 228, each of which may or may not comprise multiple cores and/or sub-cores. As such, the reference to processing engines 222, 224, 226 and 228 herein as "cores" will be understood as exemplary in nature and will not limit the scope of the disclosure.

The on-chip system may monitor temperature sensors 157, for example, which are individually associated with cores 222, 224, 226, 228 with a monitor module 114 which is in communication with a thermal policy manager ("TPM") module 101 and a modal allocation manager ("MAM") module 207. As described above, temperature measurements may represent conditions upon which a mode decision may be made by a MAM module 207. Further, although not explicitly depicted in the FIG. 3 illustration, it will be understood that the monitor module 114 may also monitor other components or conditions within a PCD that may be used as triggers for switching from one operational mode to another.

The TPM module 101 may receive temperature measurements from the monitor module 114 and use the measurements to determine and apply thermal management policies. The thermal management policies applied by the TPM module 101 may manage thermal energy generation by reallocation of workloads from one processing component to another, wilting or variation of processor clock speeds, etc. Notably, through application of thermal management policies, the TPM module 101 may reduce or alleviate excessive generation of thermal energy at the cost of QoS.

It is envisioned that in some embodiments workload allocations dictated by a TPM module 101 may essentially "trump" workload reallocations driven by the MAM module 207. Returning to the example offered above, suppose that a user of a PCD 100 preset the mode to an HPP mode and also plugged in the battery charger, but at the same time the TPM module 101 is actively engaged in application of thermal mitigation measures. In such a scenario, the MAM module 207 may prioritize the ongoing thermal mitigation over the user setting and charger availability, thereby determining that the operational mode should be a PS mode instead of the HPP mode associated with the triggers. Alternatively, under the same exemplary scenario other embodiments of a MAM module 207 may simply defer workload allocation to the TPM module 101 regardless of the mode-decision conditions.

As the mode-decision conditions change or become apparent, the monitor module 114 recognizes the conditions and transmits data indicating the conditions to the MAM module 207. The presence of one or more of the various mode-decision conditions may trigger the MAM module 207 to reference a core characteristics ("CC") data store 24 to query performance characteristics for one or more of the cores 222, 224, 226, 228. Subsequently, the MAM module 207 may select the core 222, 224, 226, 228 best equipped at the time of query to efficiently process a given block of code according to the performance goals of an operational mode associated with the recognized mode-decision conditions. For example, if the performance goal of a PS mode is to minimize current leakage, then the MAM module 207 would allocate the block of code to the particular core 222, 224, 226, 228 queried to have the most efficient IDDq rating. Similarly, if the performance goal of an HPP mode is to process workloads at the fastest speed possible, then the MAM module 207 would allocate the block of code to the particular available core 222, 224, 226, 228 queried to have the highest processing frequency. Notably, for blocks of code that require more than one processing component, it is envisioned that embodiments will allocate the workload to the combination of available processors most capable of meeting the performance goals of the particular operational mode.

Returning to the FIG. 3 illustration, the content of the CC data store 24 may be empirically collected on each of the cores 222, 224, 226, 228, according to bench tests and platform characterizations understood by those with ordinary skill in the art. Essentially, performance characteristics including maximum operating frequencies and IDDq leakage rates may be measured for each of the processing components 222, 224, 226, 228 "at the factory" and stored in CC data store 24. From the data, the MAM module 207 may determine which of the cores 222, 224, 226, 228 are best equipped to process a given workload according to the performance goals of a given operational mode. As would be understood by one of ordinary skill in the art, the CC data store 24 may exist in hardware and/or software form depending on the particular embodiment. Moreover, a CC data store 24 in hardware may be fused inside silicon whereas a CC data store 24 in software form may be stored in firmware, as would be understood by one of ordinary skill in the art.

Figure 4:
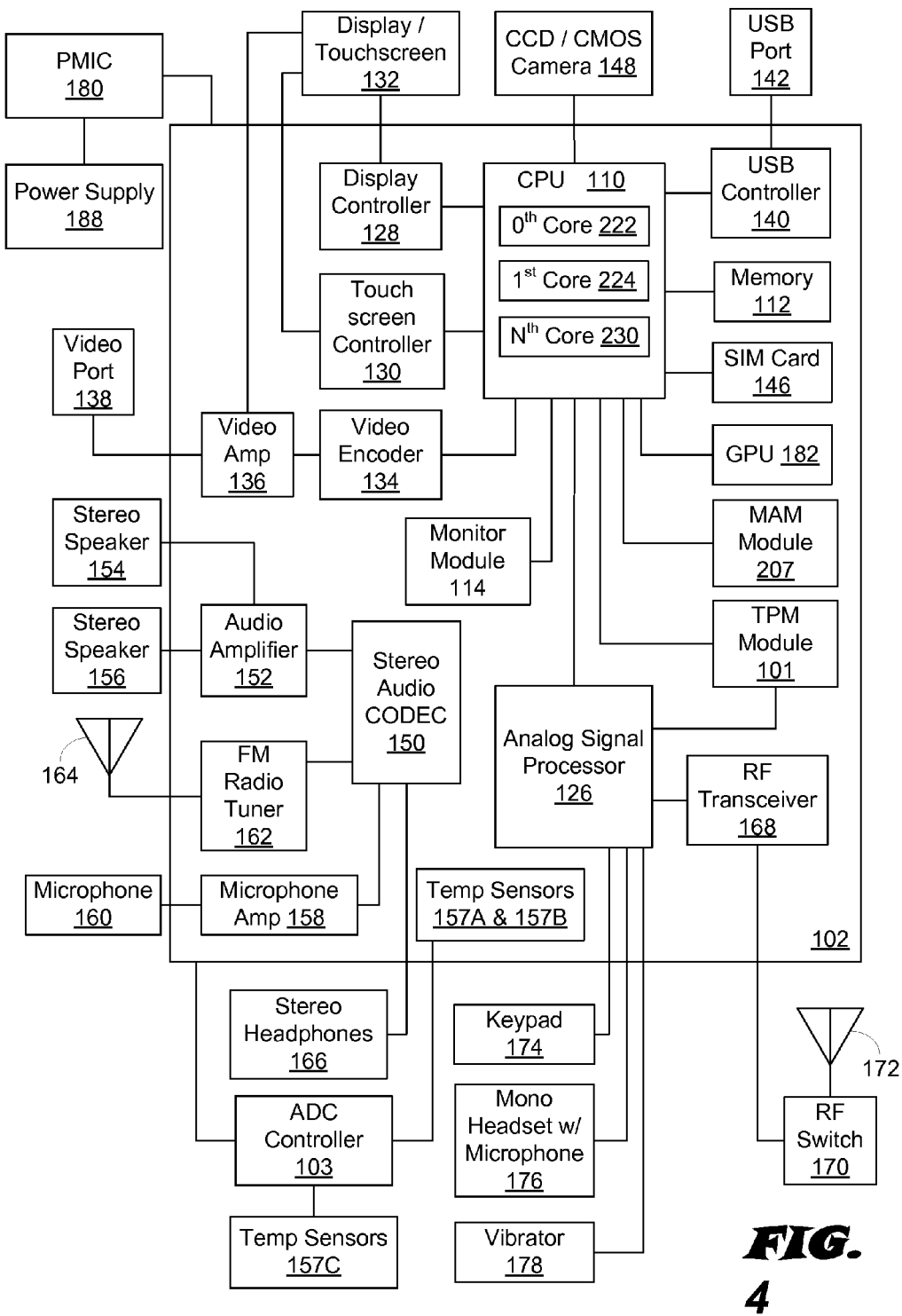
FIG. 4 is a functional block diagram of an exemplary, non-limiting aspect of a PCD in the form of a wireless telephone for implementing methods and systems for mode-based workload reallocation.

FIG. 4 is a functional block diagram of an exemplary, non-limiting aspect of a PCD 100 in the form of a wireless telephone for implementing methods and systems for mode-based workload reallocation. As shown, the PCD 100 includes an on-chip system 102 that includes a heterogeneous multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art. Moreover, as is understood in the art of heterogeneous multi-core processors, each of the cores 222, 224, 230 may process workloads at different maximum voltage frequencies and exhibit different IDDq leakage rates.

In general, the TPM module(s) 101 may be responsible for monitoring and applying thermal policies that include one or more thermal mitigation techniques. Application of the thermal mitigation techniques may help a PCD 100 manage thermal conditions and/or thermal loads and avoid experiencing adverse thermal conditions, such as, for example, reaching critical temperatures, while maintaining a high level of functionality. The modal allocation manager ("MAM") module(s) 207 may receive the same or similar temperature data as the TPM module(s) 101, as well as other condition indicators, and leverage the data to define an operational mode. Based on the operational mode, the MAM module(s) 207 may allocate or reallocate workloads according to performance characteristics associated with individual cores 222, 224, 230. In this way, the MAM module(s) 207 may cause workloads to be processed by those one or more cores which are most capable of processing the workload in a manner that meets the performance goals associated with the given operational mode.

FIG. 4 also shows that the PCD 100 may include a monitor module 114. The monitor module 114 communicates with multiple operational sensors (e.g., thermal sensors 157) and components distributed throughout the on-chip system 102 and with the CPU 110 of the PCD 100 as well as with the TPM module 101 and/or MAM module 207. Notably, the monitor module 114 may also communicate with and/or monitor off-chip components such as, but not limited to, power supply 188, touchscreen 132, RF switch 170, etc. The MAM module 207 may work with the monitor module 114 to identify mode-decision conditions that may trigger a switch of operational modes and affect workload allocation and/or reallocation.

As illustrated in FIG. 4, a display controller 128 and a touch screen controller 130 are coupled to the CPU 110. A touch screen display 132 external to the on-chip system 102 is coupled to the display controller 128 and the touch screen controller 130.

PCD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core central processing unit ("CPU") 110. A video amplifier 136 is coupled to the video decoder 134 and the touch screen display 132. A video port 138 is coupled to the video amplifier 136. As depicted in FIG. 4, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 4, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 4, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 4 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 4 further indicates that a radio frequency ("RF") transceiver 168 may be coupled to the analog signal processor 126. An RF switch 170 may be coupled to the RF transceiver 168 and an RF antenna 172. As shown in FIG. 4, a keypad 174 may be coupled to the analog signal processor 126. Also, a mono headset with a microphone 176 may be coupled to the analog signal processor 126. Further, a vibrator device 178 may be coupled to the analog signal processor 126. FIG. 4 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A and 157B as well as one or more external, off-chip thermal sensors 157C. The on-chip thermal sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop that is converted to digital signals with an analog-to-digital converter ("ADC") controller 103 (See FIG. 5A). However, other types of thermal sensors 157 may be employed without departing from the scope of the invention.

The thermal sensors 157, in addition to being controlled and monitored by an ADC controller 103, may also be controlled and monitored by one or more TPM module(s) 101, monitor module(s) 114 and/or MAM module(s) 207. The TPM module(s) 101, monitor module(s) 114 and/or MAM module(s) 207 may comprise software which is executed by the CPU 110. However, the TPM module(s) 101, monitor module(s) 114 and/or MAM module(s) 207 may also be formed from hardware and/or firmware without departing from the scope of the invention. The TPM module(s) 101 may be responsible for monitoring and applying thermal policies that include one or more thermal mitigation techniques that may help a PCD 100 avoid critical temperatures while maintaining a high level of functionality. The MAM module(s) 207 may be responsible for querying processor performance characteristics and, based on recognition of an operational mode, assigning blocks of code to processors most capable of efficiently processing the code.

Returning to FIG. 4, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, PMIC 180 and the power supply 188 are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more TPM module(s) 101 and/or MAM module(s) 207. These instructions that form the TPM module(s) 101 and/or MAM module(s) 207 may be executed by the CPU 110, the analog signal processor 126, the GPU 182, or another processor, in addition to the ADC controller 103 to perform the methods described herein. Further, the processors 110, 126, the memory 112, the instructions stored therein, or a combination thereof may serve as a means for performing one or more of the method steps described herein.

Figure 5A:
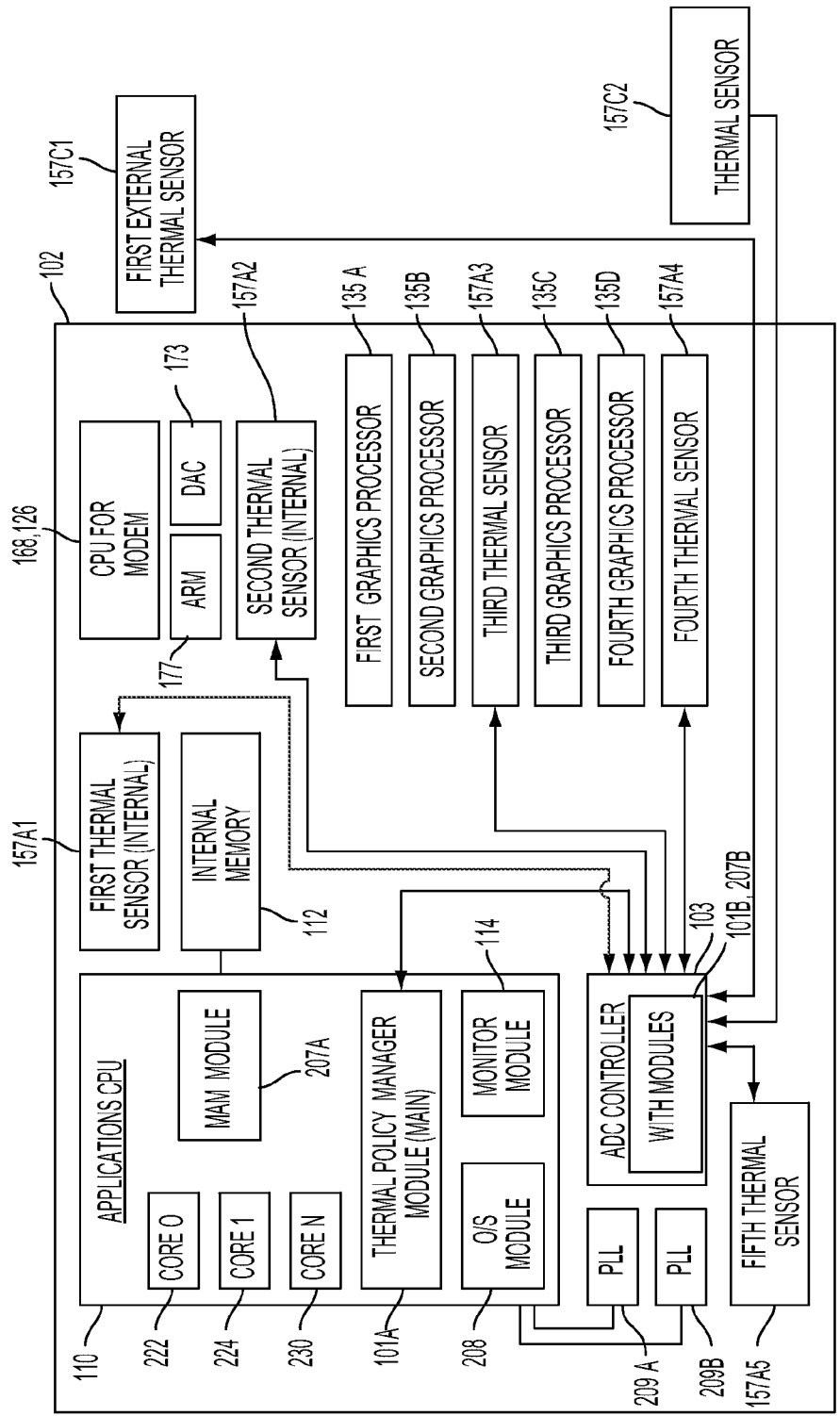
FIG. 5A is a functional block diagram illustrating an exemplary spatial arrangement of hardware for the chip illustrated in FIG. 4.

FIG. 5A is a functional block diagram illustrating an exemplary spatial arrangement of hardware for the chip 102 illustrated in FIG. 4. According to this exemplary embodiment, the applications CPU 110 is positioned on the far left side region of the chip 102 while the modem CPU 168, 126 is positioned on a far right side region of the chip 102. The applications CPU 110 may comprise a heterogeneous multi-core processor that includes a zeroth core 222, a first core 224, and an Nth core 230. The applications CPU 110 may be executing a TPM module 101A and/or MAM module(s) 207A (when embodied in software) or it may include a TPM module 101A and/or MAM module(s) 207A (when embodied in hardware). The application CPU 110 is further illustrated to include operating system ("O/S") module 208 and a monitor module 114.

The applications CPU 110 may be coupled to one or more phase locked loops ("PLLs") 209A, 209B, which are positioned adjacent to the applications CPU 110 and in the left side region of the chip 102. Adjacent to the PLLs 209A, 209B and below the applications CPU 110 may comprise an analog-to-digital ("ADC") controller 103 that may include its own thermal policy manager 101B and/or MAM module(s) 207B that works in conjunction with the main modules 101A, 207A of the applications CPU 110.

The thermal policy manager 101B of the ADC controller 103 may be responsible for monitoring and tracking multiple thermal sensors 157 that may be provided "on-chip" 102 and "off-chip" 102. The on-chip or internal thermal sensors 157A may be positioned at various locations.

As a non-limiting example, a first internal thermal sensor 157A1 may be positioned in a top center region of the chip 102 between the applications CPU 110 and the modem CPU 168,126 and adjacent to internal memory 112. A second internal thermal sensor 157A2 may be positioned below the modem CPU 168, 126 on a right side region of the chip 102. This second internal thermal sensor 157A2 may also be positioned between an advanced reduced instruction set computer ("RISC") instruction set machine ("ARM") 177 and a first graphics processor 135A. A digital-to-analog controller ("DAC") 173 may be positioned between the second internal thermal sensor 157A2 and the modem CPU 168, 126.

A third internal thermal sensor 157A3 may be positioned between a second graphics processor 135B and a third graphics processor 135C in a far right region of the chip 102. A fourth internal thermal sensor 157A4 may be positioned in a far right region of the chip 102 and beneath a fourth graphics processor 135D. And a fifth internal thermal sensor 157A5 may be positioned in a far left region of the chip 102 and adjacent to the PLLs 209 and ADC controller 103.

One or more external thermal sensors 157C may also be coupled to the ADC controller 103. The first external thermal sensor 157C1 may be positioned off-chip and adjacent to a top right quadrant of the chip 102 that may include the modem CPU 168, 126, the ARM 177, and DAC 173. A second external thermal sensor 157C2 may be positioned off-chip and adjacent to a lower right quadrant of the chip 102 that may include the third and fourth graphics processors 135C, 135D.

One of ordinary skill in the art will recognize that various other spatial arrangements of the hardware illustrated in FIG. 5A may be provided without departing from the scope of the invention. FIG. 5A illustrates one exemplary spatial arrangement and how the main TPM and MAM modules 101A, 207A and ADC controller 103 with its TPM and MAM modules 101B, 207B may recognize thermal conditions that are a function of the exemplary spatial arrangement illustrated in FIG. 5A, determine an operational mode and allocate workloads to manage thermal conditions and/or meet performance goals associated with the operational mode.

Figure 5B:
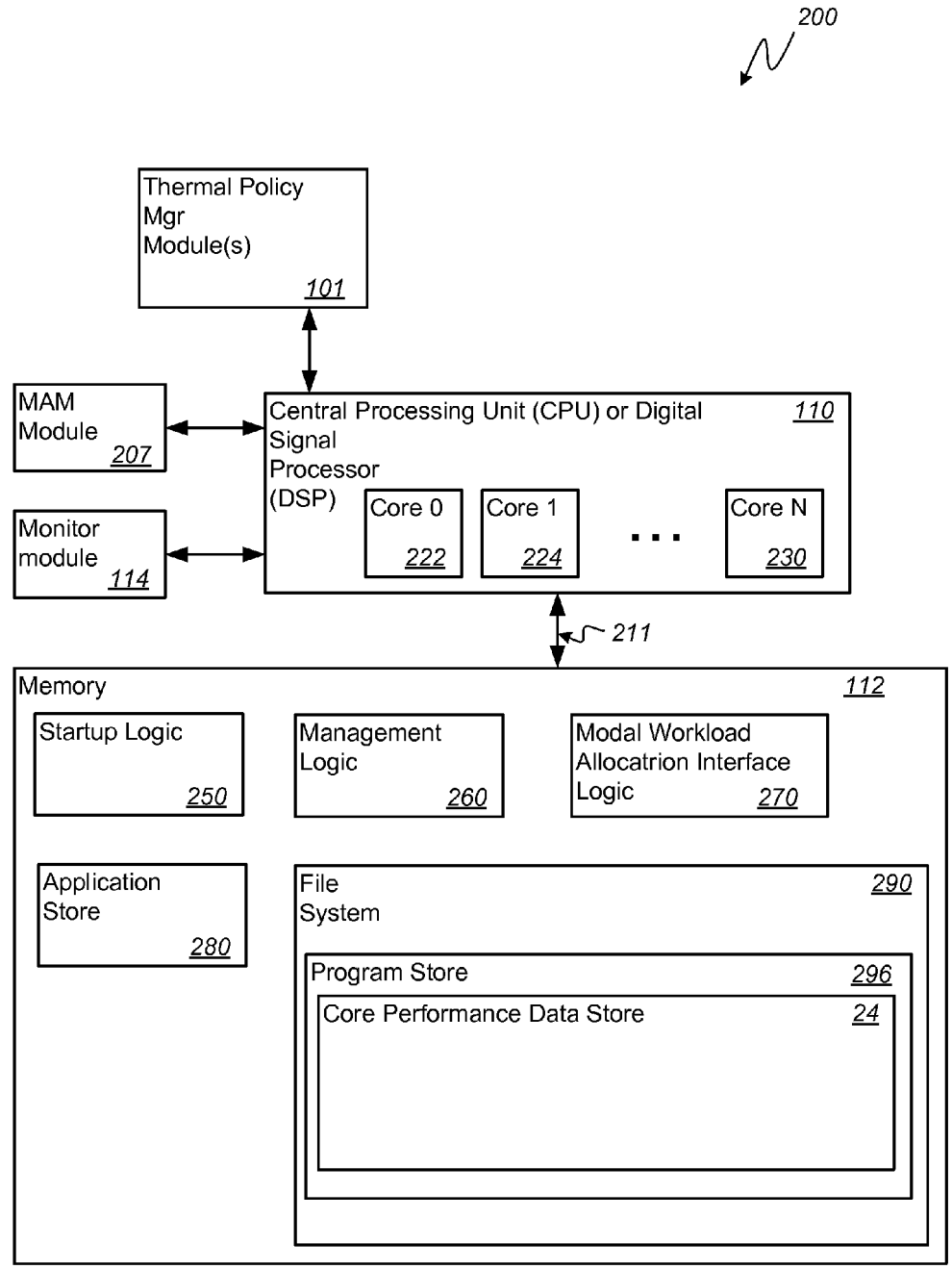
FIG. 5B is a schematic diagram illustrating an exemplary software architecture of the PCD of FIG. 4 for supporting mode-based workload reallocation.

FIG. 5B is a schematic diagram illustrating an exemplary software architecture 200 of the PCD 100 of FIG. 4 and FIG. 5A for supporting mode-based workload reallocation. Any number of algorithms may form or be part of a mode-based workload reallocation methodology that may be applied by the MAM module 207 when certain mode-decision conditions in the PCD 100 are recognized.

As illustrated in FIG. 5B, the CPU or digital signal processor 110 is coupled to the memory 112 via a bus 211. The CPU 110, as noted above, is a multiple-core, heterogeneous processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program and, as part of a heterogeneous core, may exhibit different maximum processing frequencies and different IDDq current leakage levels. Alternatively, one or more applications or programs can be distributed for processing across two or more of the available heterogeneous cores.

The CPU 110 may receive commands from the TPM module(s) 101 and/or MAM module(s) 207 that may comprise software and/or hardware. If embodied as software, the TPM module 101 and/or MAM module 207 comprises instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 5B, it should be noted that one or more of startup logic 250, management logic 260, modal workload allocation interface logic 270, applications in application store 280 and portions of the file system 290 may be stored on any computer-readable medium for use by or in connection with any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the modal workload allocation interface logic 270 are implemented in hardware, the various logic may be implemented with any or a combination of the following technologies, which are each well known in the art: a discrete logic circuit (s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for determining operational modes and selecting one or more of the available cores such as the first core 222, the second core 224 through to the $N^{th}$ core 230 for workload allocation based on the operational mode. The management logic 260 includes one or more executable instructions for terminating a mode-based workload allocation program, as well as selectively identifying, loading, and executing a more suitable replacement programs. The management logic 260 is arranged to perform these functions at run time or while the PCD 100 is powered and in use by an operator of the device. A replacement program can be found in the program store 296 of the embedded file system 290.

The replacement program, when executed by one or more of the core processors in the digital signal processor, may operate in accordance with one or more signals provided by the TPM module 101, MAM module 207 and monitor module 114. In this regard, the modules 114 may provide one or more indicators of events, processes, applications, resource status conditions, elapsed time, temperature, etc in response to control signals originating from the TPM 101 or MAM module 207.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the MAM module 207 to recognize an operational mode as a HPP mode when the video codec 134 is active.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged core characteristic data store 24. In this regard, the file system 290 may include a reserved section of its total file system capacity for the storage of information associated with the performance characteristics of the various cores 222, 224, 226, 228.

Figure 6:
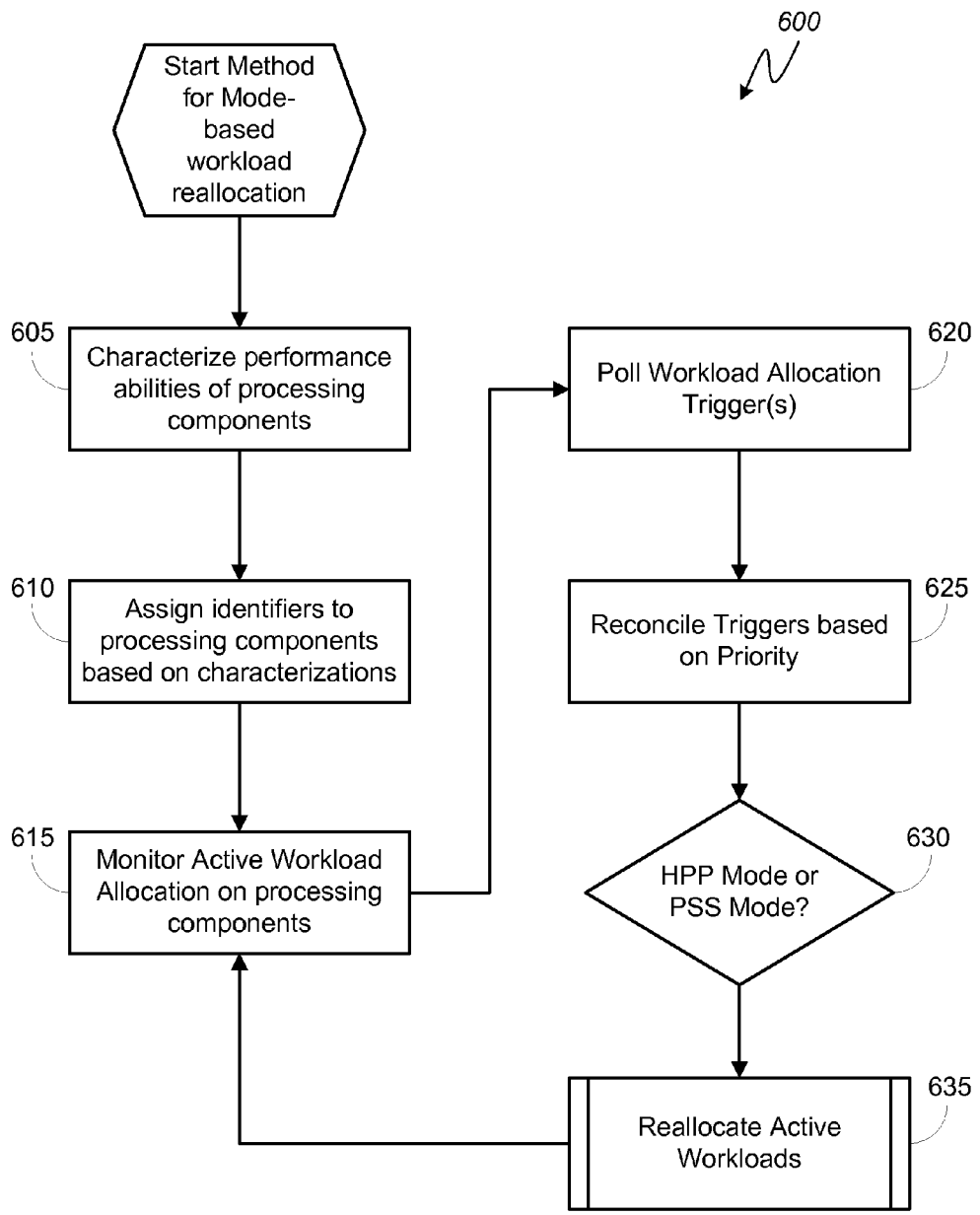
FIG. 6 is a logical flowchart illustrating an embodiment of a method for mode-based workload reallocation across heterogeneous processing components in the PCD of FIG. 4.

FIG. 6 is a logical flowchart illustrating an embodiment of a method 600 for mode-based workload reallocation across heterogeneous processing components in a PCD 100. In the FIG. 6 embodiment, the performance characteristics of each individual processing component, such as cores 222, 224, 226, 228, is characterized at block 605 and stored in CC data store 24. Notably, as described above, the various processing components in a multi-core, heterogeneous SoC are unique their individual performance characteristics. That is, certain processing components may exhibit higher processing frequencies than other processing components within the same SoC. Moreover, certain other processing components may exhibit lower power leakage rates than other processing components. Advantageously, a MAM module 207 running and implementing a mode-based reallocation algorithm may leverage the inherent differences in the performance characteristics of the heterogeneous processing components to allocate or reallocate workloads to the particular processing component(s) best equipped to process a workload consistent with operational goals (such as power saving or high speed processing).

Once the performance characteristics of the various processing cores 222, 224, 226, 228 are determined, the cores may be ranked at block 610 and identified for their individual performance strengths. For instance, referring back to FIGS. 1 and 3, core 226 may be identified as the core with the fastest processing frequency, such as core 0 of FIG. 1. Similarly, core 222 may be identified as the core with the lowest leakage rate, such as core 3 of FIG. 1. In this way, each of the cores may be ranked relative to its peers in terms of performance characteristics.

At block 615, the MAM module 207 in conjunction with the monitor module 114 tracks the active workload allocation across the heterogeneous cores 222, 224, 226, 228. At block 620, the monitor module 114 polls the various mode-decision conditions such as, but not limited to, the conditions outlined in FIG. 2. Based on the polling of the mode-decision conditions at block 620, the recognized conditions are reconciled by the monitor module 114 and/or the MAM module 207 based on priority. Subsequently, at decision block 630, the reconciled mode-decision conditions are leveraged to determine an operational mode for the PCD 110. The operational mode, in turn, may trigger the MAM module 207 to reallocate workloads across the heterogeneous cores 222, 224, 226, 228 at sub-routine 635. As described above, the reallocation of workloads by the MAM module 207 is based on the rankings of performance characteristics determined at blocks 605 and 610. After workload reallocation, the process returns to block 615 and the active workload is monitored until a subsequent reallocation is necessitated by a change in the active workload or a change in the operational mode.

Figure 7:
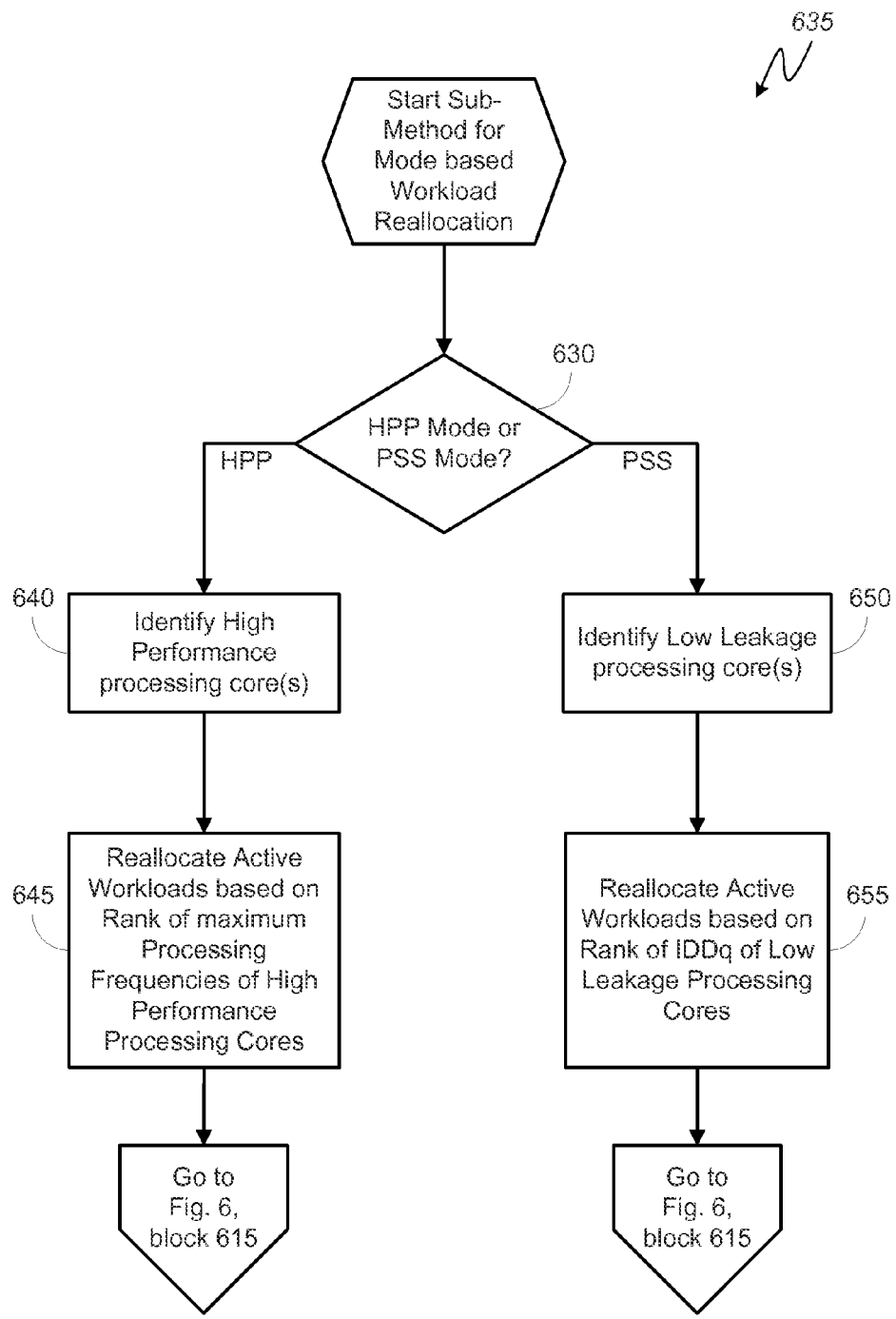
FIG. 7 is a logical flowchart illustrating an embodiment of a mode-based workload reallocation sub-routine.

Turning to FIG. 7, the mode-based workload reallocation sub-routine 635 begins after decision block 630. If decision block 630 determines that PCD 110 is in a high performance processing mode, then the "HPP" branch is followed. If, however, the decision block 630 determines that PCD 110 is in a power saving mode, then the "PS" branch is followed.

Following the HPP branch after decision block 630, the sub-routine 635 moves to block 640. At block 640, the cores determined at blocks 605 and 610 to exhibit the highest processing frequency capabilities are identified. For example, briefly referring back to the FIG. 1 illustration, the rank order of the cores by highest processing frequency performance would be cores 0 and 1 followed by cores 2 and then 3. Next, at block 645 the active workloads on the processing cores 222, 224, 226, 228 are reallocated per directions from the MAM module 207 such that the cores with the highest maximum processing frequencies are assigned the workload tasks. The process returns to block 615 of FIG. 6.

Following the PS branch after decision block 630, the sub-routine 635 moves to block 650. At block 650, the cores determined at blocks 605 and 610 to exhibit the lowest power leakage characteristics are identified. For example, briefly referring back to the FIG. 1 illustration, the rank order of the cores by lowest power leakage performance would be cores 3 and 1 followed by cores 2 and then 0. Next, at block 655 the active workloads on the processing cores 222, 224, 226, 228 are reallocated per directions from the MAM module 207 such that the cores with the lowest power leakage are assigned the workload tasks. The process returns to block 615 of FIG. 6.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for mode-based workload reallocation in a portable computing device ("PCD") having a heterogeneous, multi-processor system on a chip ("SoC"), the method comprising:
   determining the performance capabilities of each of a plurality of individual processing components in the heterogeneous, multi-processor SoC, wherein the performance capabilities comprise a maximum processing frequency and a quiescent supply current;
   ranking the plurality of processing components according to the maximum processing frequency of each of the plurality of processing components and according to the quiescent supply current of each of the plurality of processing components;
   recognizing one or more mode-decision conditions present in the PCD, wherein a mode-decision condition is associated with either a high performance processing ("HPP") mode or a power saving ("PS") mode;
   reconciling the one or more mode-decision conditions based on a priority and based on the reconciled one or more mode-decision conditions, selecting either the HPP mode or the PS mode; and
   based on the selected mode, reallocating a workload across the processing components based on the performance capabilities of each, wherein:
      if the selected mode is the HPP mode, reallocating comprises allocating the workload across the plurality of processing components based on the ranking of the maximum processing frequency of each processing component; and
      if the selected mode is the PS mode, reallocating comprises allocating the workload across the plurality of processing components based on the ranking of the quiescent supply current of each processing component.

2. The method of claim 1, wherein a recognized mode-decision condition comprises a user setting.

3. The method of claim 1, wherein a recognized mode-decision condition is associated with the HPP mode and comprises a user interface response time.

4. The method of claim 3, wherein the user interface response time is greater than 100 milliseconds.

5. The method of claim 1, wherein a recognized mode-decision condition is associated with the HPP mode and comprises a connection to a battery charger.

6. The method of claim 1, wherein a recognized mode-decision condition is associated with the HPP mode and comprises a certain use case.

7. The method of claim 1, wherein a recognized mode-decision condition is associated with the PS mode and comprises a battery capacity.

8. The method of claim 7, wherein the battery capacity is less than ten percent of a maximum battery capacity.

9. The method of claim 1, wherein a recognized mode-decision condition is associated with the PS mode and comprises a temperature reading that exceeds a predetermined threshold.

10. The method of claim 1, wherein a first recognized mode-decision condition is associated with the HPP mode, a second recognized mode-decision condition is associated with a thermal management policy, and wherein selecting either the HPP mode or the PS mode further comprises selecting the PS mode based on the thermal management policy.

11. A computer system for mode-based workload reallocation in a portable computing device ("PCD") having a heterogeneous, multi-processor system on a chip ("SoC"), the system comprising:
   a monitor module configured to:
      recognize one or more mode-decision conditions present in the PCD, wherein a mode-decision condition is associated with either a high performance processing ("HPP") mode or a power saving ("PS") mode; and
   a modal allocation manager module configured to:
      determine the performance capabilities of each of a plurality of individual processing components in the heterogeneous, multi-processor SoC, wherein the performance capabilities comprise a maximum processing frequency and a quiescent supply current;
      rank the plurality of processing components according to the maximum processing frequency of each of the plurality of processing components and according to the quiescent supply current of each of the plurality of processing components;
      reconcile the one or more mode-decision conditions based on a priority;
      based on the reconciled one or more mode-decision conditions, select either the HPP mode or the PS mode; and
      based on the selected mode, reallocate a workload across the processing components based on the performance capabilities of each, wherein:
         if the selected mode is the HPP mode, the workload is reallocated across the plurality of processing components based on the ranking of the maximum processing frequency of each processing component; and
         if the selected mode is the PS mode, the workload is reallocated across the plurality of processing components based on the ranking of the quiescent supply current of each processing component.

12. The computer system of claim 11, wherein a recognized mode-decision condition comprises a user setting.

13. The computer system of claim 11, wherein a recognized mode-decision condition is associated with the HPP mode and comprises a user interface response time.

14. The computer system of claim 13, wherein the user interface response time is greater than 100 milliseconds.

15. The computer system of claim 11, wherein a recognized mode-decision condition is associated with the HPP mode and comprises a connection to a battery charger.

16. The computer system of claim 11, wherein a recognized mode-decision condition is associated with the HPP mode and comprises a certain use case.

17. The computer system of claim 11, wherein a recognized mode-decision condition is associated with the PS mode and comprises a battery capacity.

18. The computer system of claim 17, wherein the battery capacity is less than ten percent of a maximum battery capacity.

19. The computer system of claim 11, wherein a recognized mode-decision condition is associated with the PS mode and comprises a temperature reading that exceeds a predetermined threshold.

20. The computer system of claim 11, wherein a first recognized mode-decision condition is associated with the HPP mode, a second recognized mode-decision condition is associated with a thermal management policy, and wherein select either the HPP mode or the PS mode further comprises select the PS mode based on the thermal management policy.

21. A computer system for mode-based workload reallocation in a portable computing device ("PCD") having a heterogeneous, multi-processor system on a chip ("SoC"), the system comprising:
    means for determining the performance capabilities of each of a plurality of individual processing components in the heterogeneous, multi-processor SoC, wherein the performance capabilities comprise a maximum processing frequency and a quiescent supply current;
    means for ranking the plurality of processing components according to the maximum processing frequency of each of the plurality of processing components and according to the quiescent supply current of each of the plurality of processing components;
    means for recognizing one or more mode-decision conditions present in the PCD, wherein a mode-decision condition is associated with either a high performance processing ("HPP") mode or a power saving ("PS") mode;
    means for reconciling the one or more mode-decision conditions based on a priority;
    means for selecting either the HPP mode or the PS mode based on the one or more reconciled mode-decision conditions; and
    means for reallocating a workload across the processing components based on the performance capabilities of each based on the selected mode, wherein:
        if the selected mode is the HPP mode, reallocating comprises allocating the workload across the plurality of processing components based on the ranking of the maximum processing frequency of each processing component; and
        if the selected mode is the PS mode, reallocating comprises allocating the workload across the plurality of processing components based on the ranking of the quiescent supply current of each processing component.

22. The computer system of claim 21, wherein a recognized mode-decision condition comprises a user setting.

23. The computer system of claim 21, wherein a recognized mode-decision condition is associated with the HPP mode and comprises a user interface response time.

24. The computer system of claim 23, wherein the user interface response time is greater than 100 milliseconds.

25. The computer system of claim 21, wherein a recognized mode-decision condition is associated with the HPP mode and comprises a connection to a battery charger.

26. The computer system of claim 21, wherein a recognized mode-decision condition is associated with the HPP mode and comprises a certain use case.

27. The computer system of claim 21, wherein a recognized mode-decision condition is associated with the PS mode and comprises a battery capacity.

28. The computer system of claim 27, wherein the battery capacity is less than ten percent of a maximum battery capacity.

29. The computer system of claim 21, wherein a recognized mode-decision condition is associated with the PS mode and comprises a temperature reading that exceeds a predetermined threshold.

30. The computer system of claim 21, wherein a first recognized mode-decision condition is associated with the HPP mode, a second recognized mode-decision condition is associated with a thermal management policy, and wherein the means for selecting either the HPP mode or the PS mode further comprises means for selecting the PS mode based on the thermal management policy.

31. A computer program product comprising a computer usable non-transitory medium having a computer readable program code embodied therein, said computer readable program code adapted to be executed to implement a method for mode-based workload reallocation in a portable computing device ("PCD") having a heterogeneous, multi-processor system on a chip ("SoC"), said method comprising:
    determining the performance capabilities of each of a plurality of individual processing components in the heterogeneous, multi-processor SoC, wherein the performance capabilities comprise a maximum processing frequency and a quiescent supply current;
    ranking the plurality of processing components according to the maximum processing frequency of each of the plurality of processing components and according to the quiescent supply current of each of the plurality of processing components;
    recognizing one or more mode-decision conditions present in the PCD, wherein a mode-decision condition is associated with either a high performance processing ("HPP") mode or a power saving ("PS") mode;
    reconciling the one or more mode-decision conditions based on a priority;
    based on the reconciled one or more mode-decision conditions, selecting either the HPP mode or the PS mode; and
    based on the selected mode, reallocating a workload across the processing components based on the performance capabilities of each, wherein:
        if the selected mode is the HPP mode, reallocating comprises allocating the workload across the plurality of processing components based on the ranking of the maximum processing frequency of each processing component; and
        if the selected mode is the PS mode, reallocating comprises allocating the workload across the plurality of processing components based on the ranking of the quiescent supply current of each processing component.

32. The computer program product of claim 31, wherein a recognized mode-decision condition comprises a user setting.

33. The computer program product of claim 31, wherein a recognized mode-decision condition is associated with the HPP mode and comprises a user interface response time.

34. The computer program product of claim 33, wherein the user interface response time is greater than 100 milliseconds.

35. The computer program product of claim 31, wherein a recognized mode-decision condition is associated with the HPP mode and comprises a connection to a battery charger.

36. The computer program product of claim 31, wherein a recognized mode-decision condition is associated with the HPP mode and comprises a certain use case.

37. The computer program product of claim 31, wherein a recognized mode-decision condition is associated with the PS mode and comprises a battery capacity.

38. The computer program product of claim 37, wherein the battery capacity is less than ten percent of a maximum battery capacity.

39. The computer program product of claim 31, wherein a recognized mode-decision condition is associated with the PS mode and comprises a temperature reading that exceeds a predetermined threshold.

40. The computer program product of claim 31, wherein a first recognized mode-decision condition is associated with the HPP mode, a second recognized mode-decision condition is associated with a thermal management policy, and wherein selecting either the HPP mode or the PS mode further comprises selecting the PS mode based on the thermal management policy.

\* \* \* \* \*